Feb. 19, 1924.
E. MAYER
1,484,269
METHOD AND ARRANGEMENT FOR PRODUCING NONDAMPED OSCILLATIONS
Filed June 21, 1923
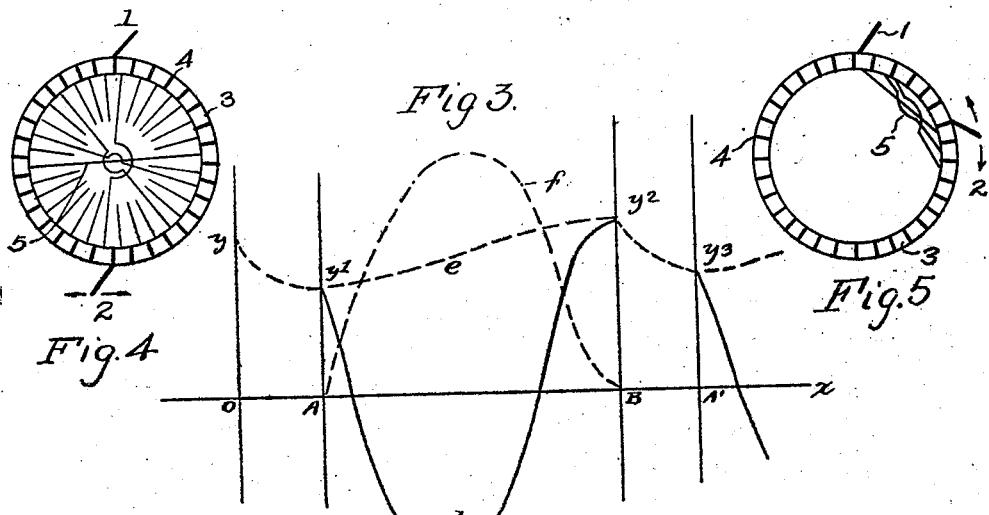
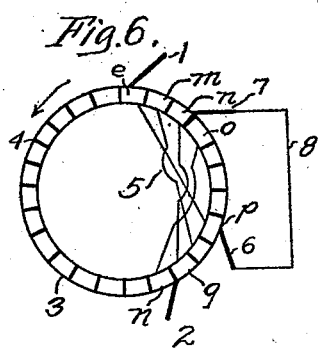
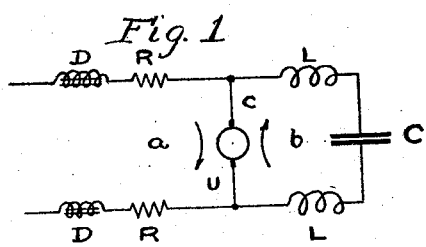
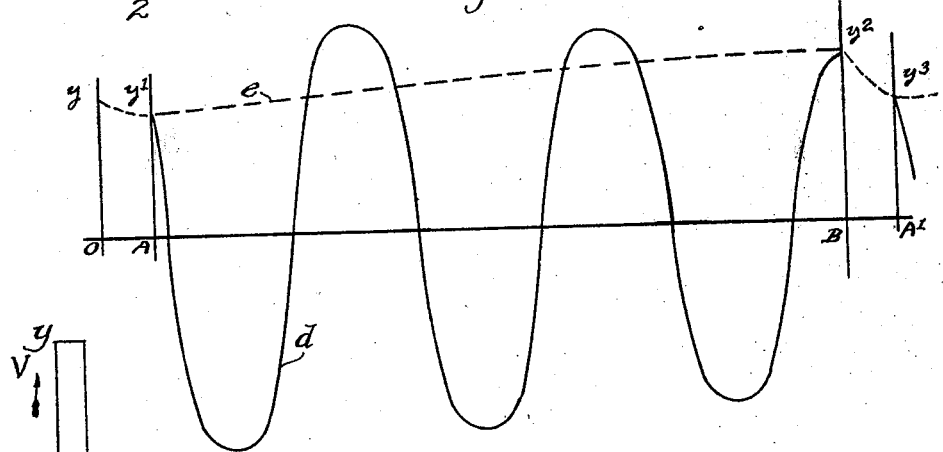
Emil Mayer
Harry R. VanDeventer Patented Feb. 19, 1924.

1,484,269

UNITED STATES PATENT OFFICE.

EMIL MAYER, OF CHARLOTTENBURG, GERMANY.

METHOD AND ARRANGEMENT FOR PRODUCING NONDAMPED OSCILLATIONS.

Application filed June 21, 1923. Serial No. 646,958.

*To all whom it may concern:*

Be it known that I, EMIL MAYER, of German nationality, residing at 61 Bismarckstrasse, Charlottenburg, Germany, have invented certain new and useful Improvements in and Relating to a Method and Arrangement for Producing Nondamped Oscillations (for which I have filed an application in Germany July 29, 1921); and I do hereby declare the following to be a full, clear, and exact description of the invention, of which the following is a specification.

My invention relates to a method and arrangement or combination for producing undamped electrical oscillations; especially oscillations of a frequency suitable for radio work.

An object of the invention is to provide convenient means whereby I can charge a circuit and then cause the circuit to discharge in a manner that will produce oscillations of the desired character. The charging of the circuit proceeds until the electrical energy stored in said circuit is such that when oscillations begin, the momentary value or strength of the oscillation current is substantially equal and opposite with respect to the value of the charging current, and the circuit then oscillates under such conditions that the charging current will be substantially equal to the amplitude of the oscillation current still existing after one complete oscillation. The circuit can then be broken without sparking, and, after a brief period of interruption and recharging, more oscillations take place as before during a relatively longer period, and this operation can be repeated as long as oscillations are needed.

Other objects and advantages of the invention will appear from the following description taken with the accompanying drawing, which shows apparatus in accordance with the principle which my invention embodies; and I, of course, reserve the right to make any changes in the shape, size and arrangement of the various parts, or steps herein disclosed, within the nature and scope of the invention, as I have defined the same in the appended claims.

In the drawing, Fig. 1 shows a circuit for producing oscillations in accordance with my invention.

Fig. 2 is a diagram to show the nature of the current employed in charging the circuit by which the oscillations are produced.

Fig. 3 is a chart to show the oscillating current in its relation to the charging current.

Figs. 4, 5 and 6 are views presenting different forms of circuit closers and interrupters used in the practice of my invention and;

Fig. 7 is a view similar to Fig. 3, but showing a current of several oscillations obtained in a single period between successive instants when the oscillating circuit is being charged.

The same numerals identify the same parts throughout.

Referring first to Fig. 1, I show a charging circuit $a$ and an oscillation circuit $b$. The charging circuit $a$ will be connected to a source of direct current through a pair of leads or conductors, in which are inductances D and resistances R; and the two leads will be connected by a conductor $e$, in which is a make-and-break device, circuit closer, or interrupter U. The circuit $b$ is in parallel with the circuit $a$, being connected to the two terminals of the conductor $c$, and containing a condenser C, and inductances L. When the circuit through $c$ is broken at the circuit closer or interrupter U, the direct current flowing in the circuit $a$ will charge the circuit $b$ and when the circuit through the conductor $c$ is established, the condenser C will discharge through the circuit $b$ and produce oscillations in this circuit. The number of interruptions of the circuit produced by the interrupter U will, of course, agree with the natural frequency of the circuit $b$. If the circuit $b$ were omitted, the energy in the circuit $a$ during the time when the breaker U is closed, could be represented by the diagram in Fig. 2, where values above the horizontal line OX can be taken as indicating voltages and values plotted horizontally to the right of the vertical line OY can be taken as indicating currents.

By referring to Fig. 3, one can see in detail the manner in which my method of producing undamped oscillation is accomplished. In this view, the broken line $e$ above the horizontal line OX represents the direct current in the circuits $a$ and $b$, the full curved line $d$ indicates the oscillating current in the circuit $b$ and the dot-anddash line $f$ represents the resultant current in the conductor $c$, during the period when the circuit is completed through the conductor $c$, and oscillations are occurring. In considering this view, the distances above the line OX may be taken as showing values of current, and the distances along the line OX to the right of the line OY, may be taken as representing time. Thus the distance OA may be taken as the time during which the interrupter U opens the circuit through the conductor $c$, so that the direct current in the circuit $a$ flows into the circuit $b$ and charges the condenser C. During this period no oscillations take place.

While the charging of the condenser C continues, the direct current will, of course, fall off somewhat as the charge of the condenser increases. This effect is represented in Fig. 3 by the curve $e$ sloping downward in Fig. 3 from the point $y$ in the line OY to the point $y^1$ in the line $Ay^1$. Immediately at the end of the period represented by the distance OA, the circuit closer U closes the circuit through the conductor $c$, the charging of the condenser now having proceeded to such a point that, when oscillations begin, the momentary value of the oscillating current will be equal to the value of the direct current at the point $y^1$. The establishment of the circuit through the conductor $c$ means in effect the cutting down of the resistance across the circuit-breaker U to zero, and this condition is maintained during the time represented by the distance between the points A and B in Fig. 3. The oscillation current in the circuit $b$ flowing through the conductor $c$ and represented by the line $d$, then passes from practically its maximum value through zero and back to a point a little above its original value, represented by the point $y^2$ on the line $By^2$, and the resultant current through the conductor $c$ is uni-directional as indicated by the curved dot-and-dash line $f$; that is to say, the part of the curve $d$, which is below the line OX, will be added to the corresponding instantaneous values of the direct or charging current represented by the line $e$ above the line OX, now flowing through the conductor $c$, and the values of the current given by points in the line $d$ above the line OX, will be subtracted from the curve $e$; whereby it will be apparent that at the moment when the oscillations commence, the current through $c$ will be zero and the moment when the circuit through $c$ is again interrupted, the resultant current will have again been reduced to zero. At the time when the circuit through $c$ is broken by the interrupter U, the value of the direct current will be equal and opposite to the momentary value of the oscillating current, and the resistance of the circuit $c$, will be practically infinite. Hence, when the circuit is interrupted, no sparking will take place. While the circuit is interrupted, the direct current in the circuit $a$ again charges the condenser C over the period represented by the distance between the points B and $A'$ in the Fig. 3. The values $By^2$ and $A'y^3$, are the same as the values OY and $Ay^1$ respectively for the current curve $e$. Thus, by successive closings of the circuit through conductor $c$, and successive interruptions, practically continuous oscillations of constant amplitude can be obtained; the periods of interruption being relatively much shorter than the periods during which the oscillations take place. In connection with the principle of operation, one must bear in mind the fact that during the period when the interrupter U opens the circuit through the conductor $c$, this conductor is free from current and the direct current now flows into the condenser C. When the interrupter U closes its circuit through the conductor $c$, the two circuits $a$, and $b$ are connected together through this conductor $c$ and then the circuit $a$ is a periodic circuit containing an E. M. F., while the other circuit $b$ is a normal oscillating circuit, without an E. M. F. When the interruption is effected in the conductor $c$, the value of the oscillating current must be substantially equal and opposite in its intensity and direction to the value of the direct current at the same instant, so that interruption can be effected in a sparkless manner, and charging must then be allowed to continue to such a point that when oscillations again commence, the oscillating current at the moment when it begins is just about equal to the value of the direct current.

To produce the making and the breaking of the circuit through the conductor $c$, the interrupter U may have the structure shown in Fig. 4. In this view the numeral 1 indicates a fixed brush, and the numeral 2 an adjustable brush, which rub upon the surface of a cylindrical member consisting of conductor bars, or segments 3, separated by insulation 4, the diametrically opposite bars 3, being connected in pairs by conductors 5. In Fig. 4, only a few of the conductors 5 are illustrated as running entirely across from one bar 3 to a bar diametrically opposite, to avoid showing too many lines at the center of this figure, but it is to be understood that all the lines 5 are continuous from a segment 3 at one extremity to a point 180° away measured around the circumference of the circuit closer. By adjusting the brush 2, the period during which the circuit is broken between the brushes 1 and 2 and the time when the circuit is made, can be so adjusted as to give the results which are indicated in Fig. 3. Fig. 5 also shows a form of circuit closer with the brushes 1 and 2 relatively close together, and each bar 3 is connected by a conductor 5, not to a bar 3 diametrically opposite, but to one that is nearer and the lines 5, although only a few are shown, will be equal in number to half the bars, so that they can connect these bars in pairs, the bars of each pair being the required distance apart, all around the circumference of the circuit closer; whereby each pair of bars and its associated conductor 5 can complete the circuit successively through the brushes 1 and 2. Of course, the extremities of the conductor $c$ will be connected to these brushes.

When two brushes are employed, the frequency depends upon the number of bars or conducting elements 3 and the number of revolutions of the circuit closer. With the same number of bars 3 and the same speed of rotation, the frequency can be doubled, trebled or even further increased by providing 2, 3 or more sets of brushes in series. For instance, Fig. 6 shows brushes 1 and 2 co-operating with brushes 6 and 7 which are united by a continuous conductor 8. The brush 1 is shown as running upon the segment $l$ from which it will pass to the bar $m$ and the brush 7 just leaving the bar $n$ to pass over upon the bar $o$. Similarly, brush 6 is in contact with a point adjacent the middle of the bar $p$, while the brush 2 is leaving the bar $q$ to pass over on the bar $r$. The bars $l$ and $p$ are connected together and so are the bars $o$ and $r$, six segments apart, so all around the circuit closer. Hence with the parts in the position shown, an interruption of the circuit through the conductor $c$ is just occurring, because the circuit runs from the brush 1, to brush 6, then to brush 7, segment $n$ and segment $q$, to brush 2. When the brushes 7 and 2 reach the middle of the segments $o$ and $r$, the brushes 1 and 6 will be passing off the segments $l$ and $p$ respectively to the next segments. Hence, the two interruptions are given in the circuit of the conductor $c$, for each pair of segments 3, owing to the presence of the two additional brushes 6 and 7 and the manner in which the four brushes co-operate, so that twice as many interruptions per revolution are obtained with the construction shown in Fig. 6, as, for example, with that shown in Fig. 4.

Mechanically the number of oscillations attainable with the process depends upon the exactness of the construction of the commutator and of its brush device as well as upon the permissible speed or upon the degree of exactness with which the interrupters are working. If it is for instance assumed that the commutator has a permissible circumferential speed of 50 meters a second and the number of periods of the high frequency oscillation which it is intended to produce amounts to 5000, then for every completed period 10 mm. are available at the circumference of the commutator. Of these 10 mm. about 8 mm. are used for the closing period and 2 mm. for the opening period. The sparkless working of the commutator makes it necessary in this case that the interrupting path be kept constant for the length of about ½ mm. which can be effected without difficulty. If with the same arrangement and the same circumferential speed 50000 periods shall be produced, the accuracy has to be increased to 1/20 mm. If in doing so, difficulties should arise, they can be easily overcome if there is a replenishing of the oscillation circuit with energy from the direct current source with every second, third period, etc. Then oscillations are obtained as illustrated in Fig. 7.

This view shows oscillations consisting of three cycles for every period between successive interruptions of the circuit through the conductor $c$, and, though the amplitude of the oscillations is not perfectly constant, they do not offer any practical disadvantage, especially if the number of oscillations or cycles be increased to five.

The ratio between the time during which the circuit through $c$ is closed and the time when it is opened remains the same, but both of these periods are somewhat larger than previously. The fundamental frequency produced by the interrupter can also be increased in the same manner as in static frequency transformers, in order to obtain the higher harmonics of the oscillations.

Having described my invention what I believe to be new and desire to secure and protect by Letters Patent of the United States is:—

1. The method of operating an apparatus for the production of continuous oscillations of the type in which a charging circuit is connected to an oscillatory circuit and is periodically short-circuited by an interrupter, said method comprising the adjustment of the point of short-circuit to occur at the instant when the current in the charging circuit becomes equal to and in the opposite direction to the initial value of the oscillatory current, with respect to the short-circuit through the interrupter, and adjusting the point of the interruption of the short-circuit to occur at the instant when the oscillatory current through the interrupter becomes equal and opposite to the current from the charging circuit.

2. The method of operating an apparatus for the production of continuous oscillations of the type in which the charging circuit is connected with an oscillatory circuit and is periodically short-circuited by an interrupter, said method comprising the adjustment of the point of short-circuit to occur at the instant when the charging current becomes equal to and in the opposite direction to the initial value of the oscillatory current, with respect to the circuit through the interrupter.

3. The method of operating an apparatus for the production of continuous oscillations of the type in which the charging circuit is connected with an oscillatory circuit and is periodically short-circuited by an interrupter, said method comprising the adjustment of the point of the interruption of the short-circuit to occur at the instant when the oscillatory current in the interrupter becomes equal and opposite to the current from the charging circuit.

4. The combination of a charging circuit, a circuit to receive energy from the charging circuit and produce oscillations, a conductor common to said circuits, a rotatable circuit-closer in the line of said conductor, said circuit-closer comprising conducting segments connected in pairs and separated by insulation; a pair of brushes in the line of said conductor and running upon said segments, a second pair of brushes between the first pair and connected together, said brushes being disposed at such points and located at such distances apart, that the circuit through the conductor can be interrupted and closed a plurality of times for each pair of connected segments during each revolution.

In testimony whereof I have signed my name to this specification in the presence of two subscribing witnesses.

E. MAYER.

Witnesses:
  ERWIN C. KURWEIDEL,
  RIEGE T. ANPACH.